United States Patent [19]

Yamaura et al.

[11] 4,339,802

[45] Jul. 13, 1982

[54] DIGITAL PROTECTIVE RELAYING DEVICES

[75] Inventors: Mitsuru Yamaura; Ryotaro Kondow, both of Fuchu; Megumu Mitani, Tama; Eiichi Okamoto, Tokyo, all of Japan

[73] Assignee: Tokyo Shibaura Denki Kabushiki Kaisha, Kawasaki, Japan

[21] Appl. No.: 65,447

[22] Filed: Aug. 10, 1979

[51] Int. Cl.³ .......................... G06F 15/56; H02H 3/28
[52] U.S. Cl. ...................................... 364/483; 361/78; 361/87
[58] Field of Search .................................. 361/79–82, 361/93, 94, 87, 68, 78; 364/483, 492

[56] References Cited

U.S. PATENT DOCUMENTS

| | | | |
|---|---|---|---|
| 4,204,249 | 5/1980 | Dye et al. | 364/492 X |
| 4,218,737 | 8/1980 | Buscher et al. | 364/483 X |
| 4,219,860 | 8/1980 | DePuy | 364/483 X |
| 4,224,685 | 9/1980 | Sasaki et al. | 364/483 X |
| 4,228,476 | 10/1980 | Okita et al. | 364/483 X |

*Primary Examiner*—Edward J. Wise
*Attorney, Agent, or Firm*—Stevens, Davis, Miller & Mosher

[57] ABSTRACT

In a digital protective relaying device utilizing a microcomputer for protecting an electric power transmission system, a setting switch is provided for writing the values into the computer after the relaying operation of the protective device is locked by a locking means. The protective values thus set in the computer is indicated on an indicating device under the control of the computer and visually checked by an operator, while the computer always confirming the coincidence of the set values with the indicated values.

3 Claims, 5 Drawing Figures

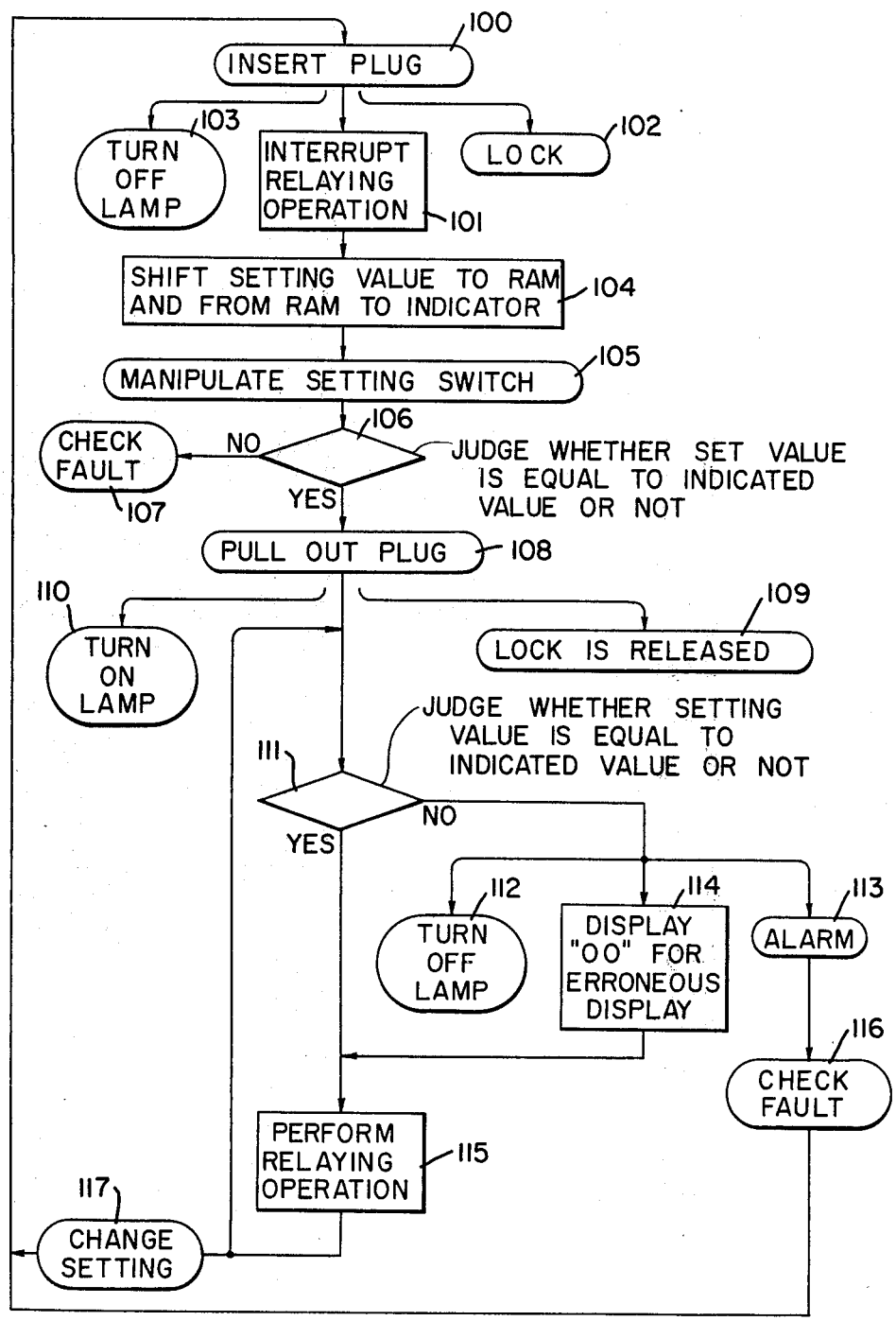

DIGITAL PROTECTIVE RELAYING DEVICES

BACKGROUND OF THE INVENTION

This invention relates to devices for protecting electric power transmission systems and the like utilizing computers, and more particularly to a digital protective relaying device provided with a setting device and an indicating device.

A prior known digital protective relaying device utilizing a computer has ordinarily comprised devices for sampling analog electrical values required for the protection at a sampling frequency, and introducing the thus obtained digital values into the computer for controlling the operation of the digital protective relaying device.

In this kind of protective relaying device, however, since there is a fundamental difference in the procedures for handling the analog values and the digital values, the conventional analog value setting device cannot be used for setting digital values.

Furthermore, in the conventional protective relays utilizing analog values, there has been provided no device for assuring the accuracy of the analog values after the values have been once set in the protective relays. The lack of such a confirmation device constitutes a drawback of the conventional device when the device is intended to be used as a protective relaying device of the digital type, particularly when the digital device is used for the protection of an important system such as an electric power transmission system wherein an extremely high precision is required for the protective relaying device.

SUMMARY OF THE INVENTION

Therefore, a primary object of the present invention is to provide a digital protective relaying device including a computer and adapted for the protection of an electric power transmission system, wherein there is further provided a setting-and-indicating device that can improve the reliability in setting electric values and permits a change in the set values without interrupting the operation of the electric power transmission system.

According to the present invention, there is provided a digital protective relaying device for protecting an electric power transmission system by the use of an electronic computer, the relaying device comprising means for locking the relaying operation regardless of the operation of the electric power transmission system, setting means for writing the set values into the computer after the relaying operation thereof is locked, and means for indicating the set values under the control of the computer, whereby the computer carries out the relaying operation after releasing the locking means, while the coincidence of the set values with the indicated values is confirmed by the computer.

BRIEF DESCRIPTION OF THE DRAWING

In the accompanying drawing:

FIG. 3 is a flow chart showing the operation of the protective relaying device; and, FIGS. 4(a) and 4(b) are flow charts showing process steps of a computer used in the invention in a normal operation and in a data setting operation, respectively.

DESCRIPTION OF THE PREFERRED EMBODIMENTS

Figure 1:
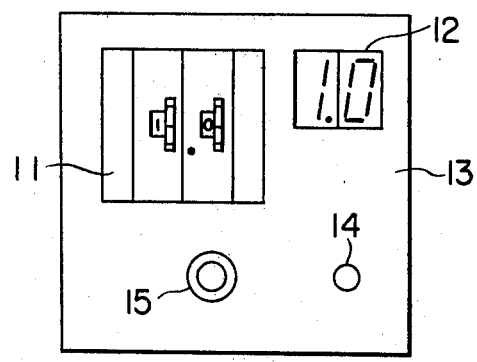
FIG. 1 is a plan view showing one example of a setting-and-indicating part of a digital protective relaying device according to the present invention.

Referring now to FIG. 1, there is indicated a setting-and-indicating device for a digital protective relaying device of, for instance, an overcurrent protecting type, although the invention is not necessarily limited to such a type of protective device. The setting-and-indicating device comprises a pair of setting switches 11 and a pair of indicators 12 both provided on the front panel 13 of the relaying device. The setting switches 11 are made of two digital switches, and the indicators 12 comprise two digital indicating elements made, for instance, of light emitting diodes or liquid crystal cells.

On the front panel 13, there are further provided a lamp 14 and a locking terminal (or socket) 15. The lamp 14 is turned off when a locking plug (not shown) is inserted into the locking terminal 15 for locking the operation of the relaying device, and is turned on when the locking plug is pulled out of the terminal 15 for resuming the protective operation of the protective device.

The setting switches 11 in the example shown in FIG. 1 are used for an overcurrent protective relay, for setting a current value at which the protective relay is to be operated, and the indicators 12 indicate the thus set values under the control of the computer (microcomputer or the like) as will be described hereinafter in detail.

Although not indicated in FIG. 1, there may further be provided another pair of setting switches similar to the setting switches 11, and another pair of indicators similar to the indicators 12, for setting and indicating a time delay which occurs in tripping a circuit breaker.

Figure 2:
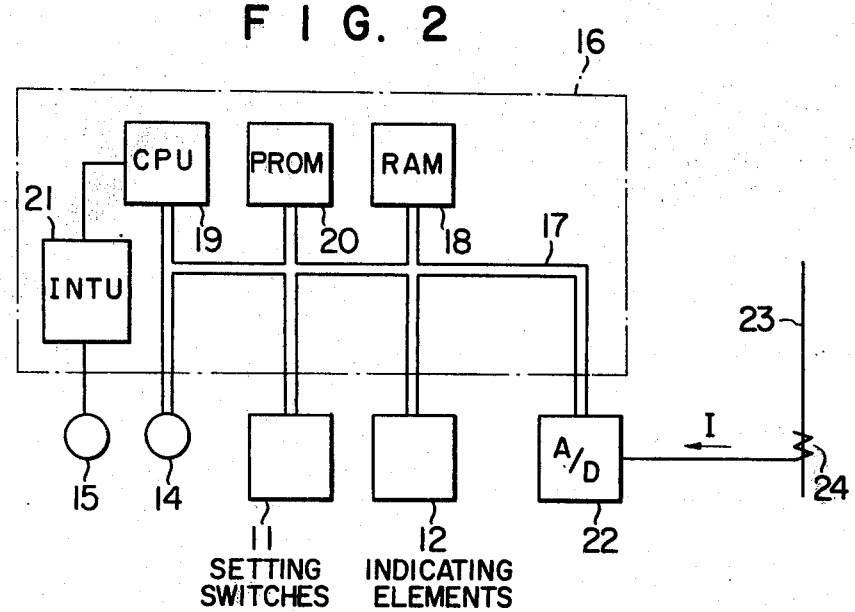
FIG. 2 is a block diagram of the digital protective relaying device of this invention.

In FIG. 2, there is illustrated a fundamental block diagram of a digital protective relaying device according to the present invention. In this drawing, parts surrounded by dot and dash lines represent, for instance, a computer which performs logic or arithmetic relaying operation for determining whether a circuit breaker is to be tripped or not. The setting switches 11 and the indicators 12 are both connected to a bus line 17 provided in the computer for transmitting and receiving required data therethrough. A lamp 14 on the front panel of the relaying device is also connected to the bus line 17 in the computer 16.

The computer 16 contains a random access memory device (RAM) 18, a central processing unit (CPU) 19, and a programmable read-only memory device (PROM) 20 that stores instructions or programs for controlling the operation of CPU 19, all connected to the bus line 17. A locking terminal 15 is connected to the CPU 19 through an interrupting unit (INTU) 21 which sends out an interruption signal to the CPU 19. The bus line 17 is further connected to an analog/digital converter 22 which converts the output from a current transformer 24 connected in series with an electric power transmission line 23 into a digital signal.

Figure 4A:
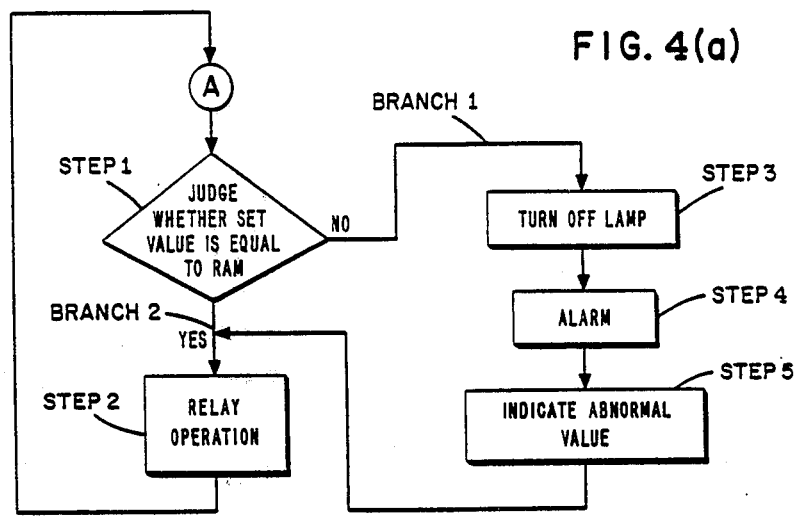

The operation of the digital protective relaying device according to the present invention will now be described with reference to FIGS. 2 and 4.

Where the protective relaying device is in an operating state, the CPU 19 always performs a so-called "relaying operation" through program 4(a) in which the electric current flowing through the power transmission line 23 is compared with the value set by the setting switches 11 (step 2 in FIG. 4(a)). Upon insertion of the plug into the locking terminal 15, the CPU 19 is subjected to an interruption through the INTU 21, and locks the "relaying operation" and enters interrupt program 4(b) turning off the lamp 14 (step 6 in FIG. 4(b)). When the turning off of the lamp 14 is recognized by an operator, the setting switches 11 are manipulated to change the settings as desired.

Figure 4B:
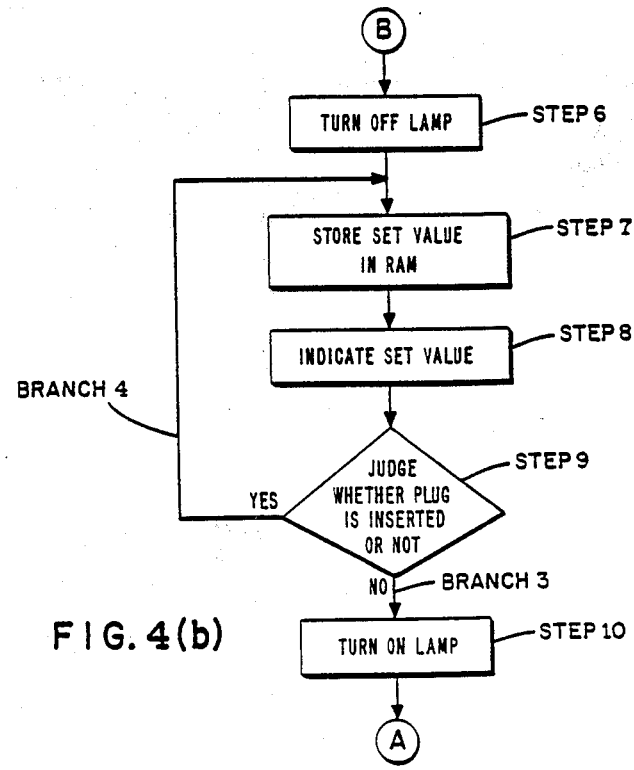

The value newly set by the setting switches 11 is sent over the bus line 17, and is stored in RAM 18 (step 7 in FIG. 4(b)) and indicated on the indicating elements 12 (step 8 in FIG. 4(b)) under the control of CPU 19. The above described operation is carried out in accordance with the interrupting program 4(b) stored in the PROM 20 of the computer 16. After the above described operation has been made, the operator visually confirms that whether the value set by the setting switches 11 coincides with the value indicated by the indicating elements 12 or not, and when the coincidence is confirmed, the plug is pulled out of the locking terminal 15.

The removal of the plug out of the locking terminal 15 is deleted (step 9 in FIG. 4(b)) and this causes the lamp 14 to be turned on (step 10 in FIG. 4(b)), and the locking of the relaying operation is released as the computer returns to the relaying operation program (FIG. 4(a)). However, before entering into the relaying operation, CPU 19 confirms the coincidence of the value set by the setting switches 11 with the value memorized in RAM 18 (step 1 in FIG. 4(a)). Upon confirmation of the coincidence, the relaying operation is resumed (step 2 in FIG. 4(a)). It should also be noted that even after the resumption of the relaying operation, by availing every unoccupied time interval between the successive relaying operations, the CPU 19 compares the set value by the setting switches 11 with the value memorized in RAM 18, and when a difference is found therebetween, the lamp 14 is turned off (step 3 in FIG. 4(a)) and an alarm is issued (step 4 in FIG. 4(a)).

It may also be possible that when any difference is found between the two values, the erroneous digits in the value are exhibited by showing on the corresponding indicating elements 12, abnormal values such as "00" which never appear in the set values (step 5 in FIG. 4(a)). This operation may also be performed by the CPU 19 according to a program stored in the PROM 20. In the case where an alarm is issued and the erroneous digit is indicated as described above, the plug is again inserted into the locking terminal 15, and the erroneous value is reset by means of the setting switches 11.

A more complete description of the system operation, integrating the computer operation sequences described above with reference to FIGS. 4(a) and 4(b) with the operators actions, can be seen in FIG. 3. Referring now to FIG. 3, when the locking plug is inserted into the locking terminal 15 in FIG. 1 as indicated by a step 100, the relay operation is interrupted at a step 101, locked by a step 102, and the lamp 14 is turned off at a step 103 which corresponds to the step 6 in FIG. 4(b). A step 104 in FIG. 3 corresponds to the steps 7 and 8 in FIG. 4(b).

After a new value has been set at a step 105, the operator visually checks whether the set value is equal to the value indicated in the indicator 12 or not at a step 106, and when the two values are not equal to each other, the reason is investigated at a step 107. When the two values coincide with each other, the plug is pulled out at a step 108, and the lock of the relay operation is released at a step 109 while the lamp 14 is turned on at a step 110. The steps 109 and 110 correspond to steps 9 and 10 in FIG. 4(b), and a step 111 corresponds to the step 1 in FIG. 4(a).

At the step 111, the value stored in the RAM 18 is compared with the value set by the setting switch at the step 105. When the two values are found equal, relay operation is carried out at a step 115 corresponding to the step 2 in FIG. 4(a). The steps 111 and 115 are repeated for determining any fault in the power transmission system. Steps 112, 113 and 114 correspond to the steps 3, 4 and 5 in FIG. 4(a), and are executed when the two values are found to be unequal. The operator knows from the alarm and the indication about the existence of a setting fault, and checks at a step 116 for the reason of the fault. Where a change in a set value is required, a step 117 is followed, returning the operation of the device of the invention to the step 100.

As described hereinabove, according to the present invention, since the value set by the setting switches 11 is indicated on the indicating elements 12 under the control of the computer 16, the indicated value is visually checked by the operator, and furthermore, the correctness of the set value is also confirmed by the computer 16, the reliability of the set value is elevated remarkably.

When the setting value is to be changed, the relaying operation is locked by merely inserting the plug into the locking terminal 15, and since the number of times for checking the correctness of the set value are far increased, correct setting of the protective value can be always assured regardless of the operating time of the electric power transmission system. In addition, it is apparent that the setting of the protective value at the time of the initiation of the operation of the system may also be performed as described above by inserting the plug into the locking terminal.

What is claimed is:

1. In a digital protective relaying device for protecting an electric power transmission system, the device comprising an analog/digital converter for converting an electric quantity related to said electric power transmission system to a digital value, an electronic computer of a digital input/output type for performing a relaying operation, a setting switch for setting a value required for the protection of said power transmission system in said computer, and an indicator, the improvement comprising:

means for locking the relaying operation of said computer, means for storing in said computer the value set by said setting switch during the locking period of said computer, means for indicating said value stored in said computer in said indicator, means for releasing the locking of said computer, means for comparing the value set by said setting switch with the value stored in said computer, and means for generating an alarm signal when the two values thus compared are found to be unequal.

2. A digital protective relaying device as set forth in claim 1 wherein a lamp is further provided for indicating a locking state of the relaying operation.

3. A digital protective relaying device as set forth in claim 1 further comprising:

means for maintaining the relaying operation of said computer in a locked state when inequality is found between said two values, and means for indicating a predetermined numeral or symbol when inequality is found between said two values.

* * * * *